Patented Mar. 19, 1946

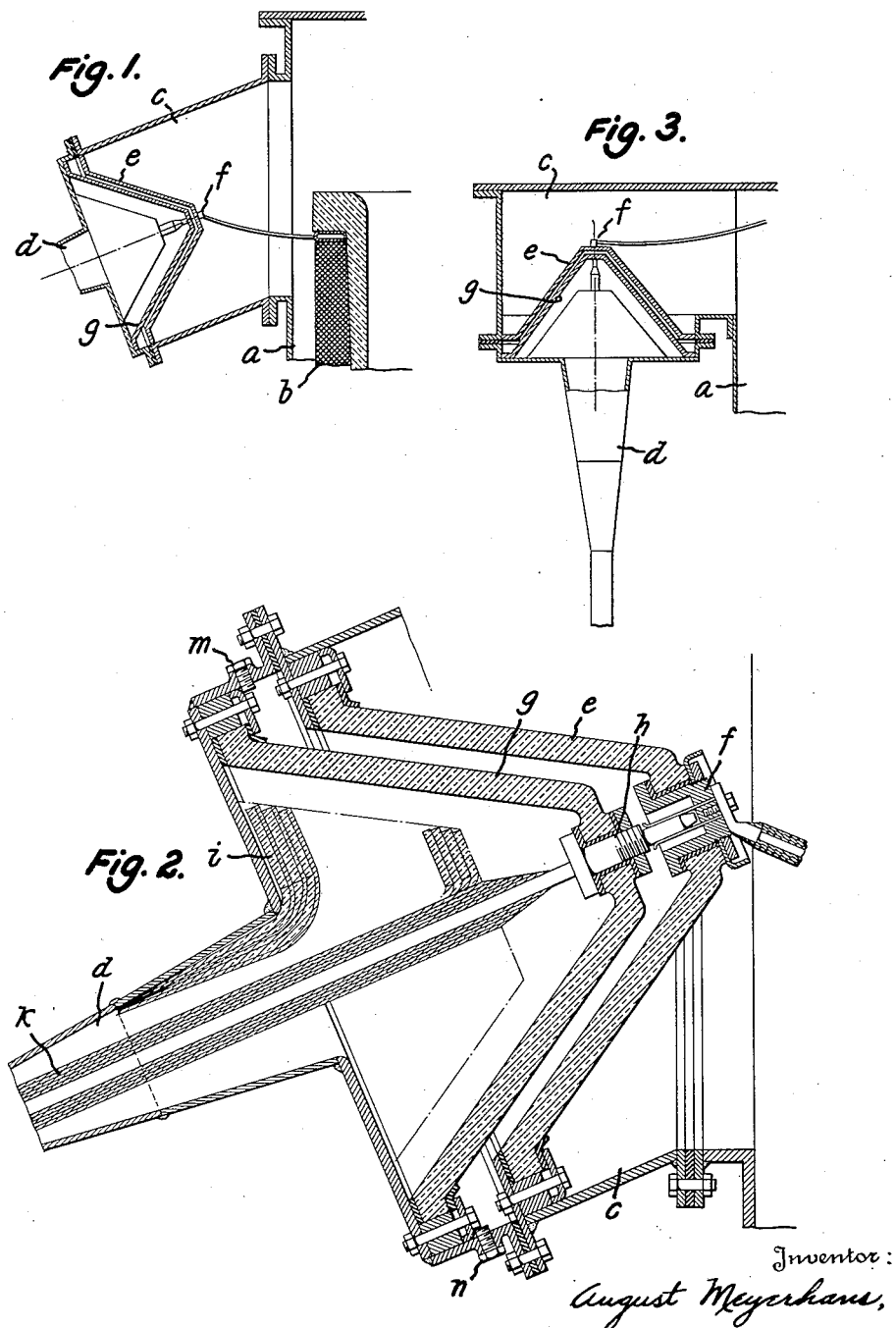

2,396,871

UNITED STATES PATENT OFFICE 2,396,871

HIGH VOLTAGE CABLE CONNECTION

August Meyerhans, Rieden, near Baden, Switzerland, assignor to Aktiengesellschaft Brown, Boverie & Cie., Baden, Switzerland Application November 9, 1943, Serial No. 509,605
In Switzerland October 15, 1942

3 Claims. (Cl. 174—21)

The invention deals with a cable connection for a high voltage cable on the tank of an electric apparatus, for instance a transformer, which is filled with a liquid, gaseous or solid insulating material. For the connection of cables on transformers it is known to build a special container on to the side wall of the transformer tank which surrounds the cable box and is also filled with oil, a bushing insulator projecting into this container for the end of the transformer winding which is to be brought out. The brought-out end of the winding is for instance connected to the cable end by means of an extensible conductor which can be removed when testing the cable. This arrangement requires a cable connection of large dimensions, especially where high voltages are concerned, and this in turn results in large quantities of insulating oil being required so that the transformer becomes bulky and heavy. The large dimensions of the cable connection are due to the presence of a double insulating gap between the wall of the apparatus tank and the point where the cable is introduced into the apparatus.

The present invention concerns a high voltage cable connection on the tank of an electrical apparatus filled with insulating material, for instance a transformer, whereby the aforementioned disadvantages are avoided by the tank possessing a shed insulator which is directed towards the inside of the tank and serves for leading in the conductor end, the cable box with its cover insulator extending into this shed insulator.

Constructional examples of a cable connection on a transformer are illustrated diagrammatically in longitudinal section in Figs. 1 and 3 of the accompanying drawing, whilst Fig. 2 shows the cable connection to a larger scale also in longitudinal section.

In the drawing $a$ indicates the oil-filled transformer tank and $b$ the high-voltage transformer winding. On the side wall of the transformer vessel a cylindrical housing $c$ is provided which is also filled with oil and serves to house the connection of the cable $d$, the end of the winding $b$ which is brought out of the tank and the joint for both conductors. Inside the opening of the housing $c$ a conical insulator $e$ is fixed in an oiltight manner and extending towards the inside of the cylindrical housing and the transformer vessel. The holder $f$ which is fitted in an oiltight manner into the insulator $e$ and is provided for the brought-out end of the conductor is constructed in the form of a plug socket. The cable box for the cable $d$ possesses an insulator in the form of cover insulator $g$ which projects into the conical insulator $e$ and is adapted to suit the shape of the latter. The cable box is thus built in the form of a plug element which fits into the socket in the conical insulator. The cable box is fixed to the cylindrical container by means of bolts. The space between the cover insulator $g$ and the conical insulator $e$ is filled with insulating material, for instance oil or compressed air or gas. The connection between the cable box and the housing $c$ as well as that between the cable box and the cover insulator must be oil or pressure tight. The plug portion $h$ must also be mounted in the cover insulator in an oil or pressure tight manner. The insulator $k$ of the cable $d$ is strengthened by additional layers of paper insulation rolled round the cable, the strengthened insulation in the direction towards the cable being in a known manner constructed so as to form an expanded flange $i$.

With the arrangement according to the invention a considerable amount of space in a longitudinal direction is saved due to the cover insulator being inserted into the conical insulator. This also results in a saving in material for the cable connection and transformer and consequently in a reduction in weight. The cable box can be easily dismantled.

When the conical insulator into which the cover insulator of the cable box extends is mounted in the cylindrical housing, care must be taken that both insulator surfaces are so inclined that air pockets cannot form between them and that the air or gas collects at the highest point where it can be discharged. For this purpose a discharge screw plug $m$ is provided. This screw plug can also be removed temporarily to enable the space between the insulators to be filled with oil or compressed air.

The insulating material in the space between the insulators may be removed by way of the discharge screw $n$.

Another way in which the housing $c$ can be mounted on the transformer tank $a$ is illustrated in Fig. 3. In this case it is necessary to remove the air from the space between the shed insulator $e$ and the cover insulator $g$ of the cable box before the insulating oil is introduced.

Instead of locating the cable connection in a dome-shaped container built on to the apparatus tank, as is the case with the constructional examples shown in the figures, it is also possible to fit the connection directly to the tank itself.

I claim:

1. In a high tension electrical device of the type having a tank, an electrical apparatus contained within the tank, a fluid insulating material surrounding the electrical apparatus and a cylindrical terminal receiving housing extending outwardly and downwardly from said tank; a cable connector comprising a conical insulator extending into said cylindrical housing, a clamping ring for securing said insulator to said cylindrical housing, a gasket positioned to seal said insulator to said cylindrical housing, a terminal socket secured to the inner end of said insulator, means for electrically connecting said socket with said electrical apparatus, a second conical insulator, a line cable, a terminal box comprising a flat disc having a central opening, an upstanding L-shaped flange secured to the perimeter of said disc, a flaring entrance member secured to said disc about said opening at the side opposite said second insulator, a clamping ring for clamping said second-named conical insulator to said disc, a sealing gasket positioned between said insulator and said disc, a terminal plug secured to the inner end of said second-named conical insulator and connected to said line cable, said plug and said socket being adapted to interfit and provide an electrical connection therebetween, means for securing said L-shaped flange to said cylindrical housing, whereby said second-named insulator will extend into said first-named insulator with said plug contacting said socket, and a sealing gasket between said L-shaped flange and said cylindrical housing.

2. In a high tension electrical device, the invention as recited in claim 1 in which the L-shaped flange is provided with an insulating oil filling opening and a draining opening, and closures for said openings.

3. In a high tension electrical device, the invention as recited in claim 1 in which an insulating layer is formed to surround the cable within the cable-end insulator, said insulation extending along said cable through the opening in said disc and then being folded so as to lie flat against said disc.

AUGUST MEYERHANS.